No. 857,150. PATENTED JUNE 18, 1907.
G. S. BLAKE.
BRAKE MECHANISM.
APPLICATION FILED JUNE 4, 1906.
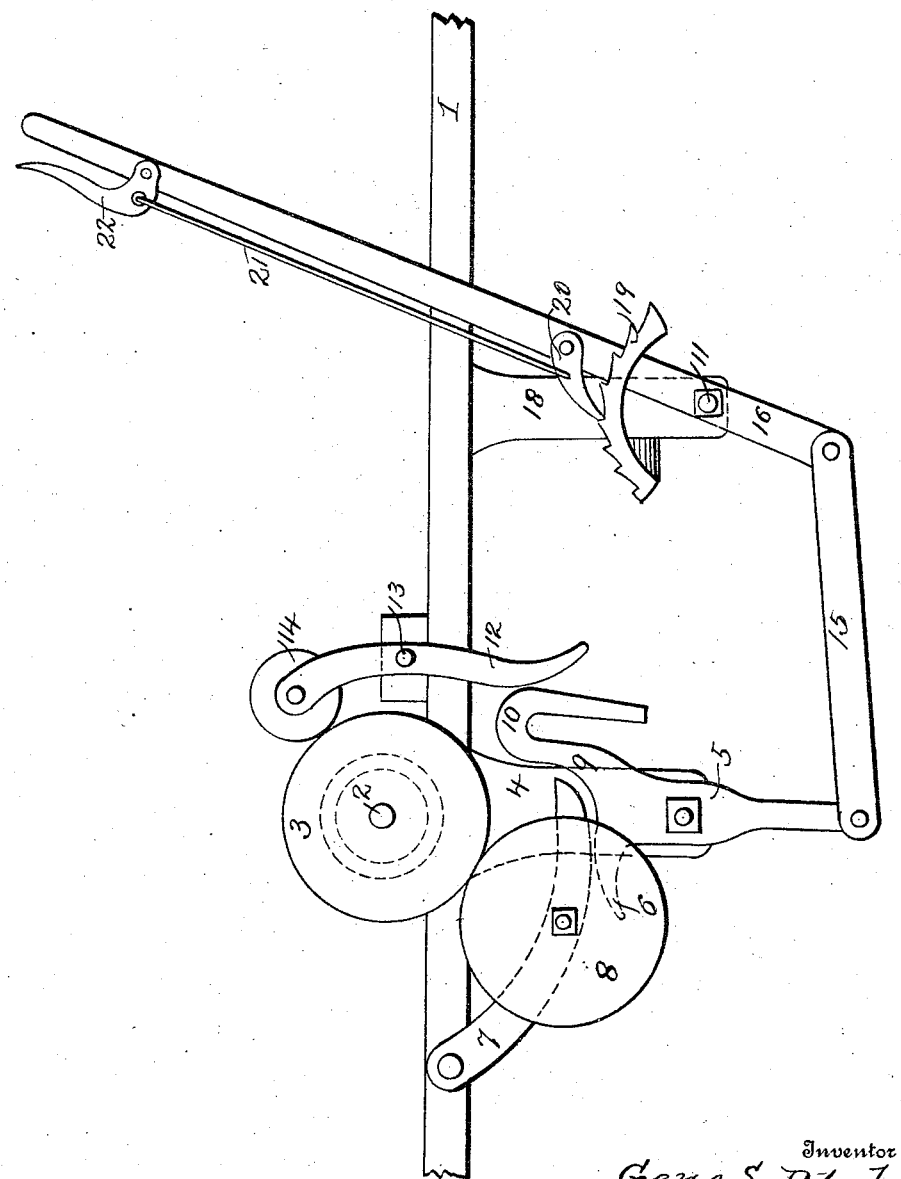
Inventor
Gene S. Blake
Witnesses
L. E. Barkley
Wilfred E. Lawson
By
Attorney

UNITED STATES PATENT OFFICE.

GENE S. BLAKE, OF POTOMAC, ILLINOIS.

BRAKE MECHANISM.

No. 857,150.

Specification of Letters Patent.

Patented June 18, 1907.

Application filed June 4, 1906. Serial No. 320,120.

*To all whom it may concern:*

Be it known that I, GENE S. BLAKE, a citizen of the United States of America, residing at Potomac, in the county of Vermilion and State of Illinois, have invented certain new and useful Improvements in Brake Mechanism, of which the following is a specification.

This invention has relation to new and useful improvements in mechanical motors and pertains more particularly to that class operated by springs and weights.

It is an object of this invention to provide in combination with a device of this character, novel means whereby the speed of the motor can be controlled, said controlling device also acting as a brake.

Furthermore, it is an object of this invention to provide a device that will be simple in construction, efficient in practice and economical to manufacture.

With the foregoing and other objects in view, the invention consists in the details of construction, and in the combination and arrangement of parts to be hereinafter more fully set forth and specifically claimed.

Referring to the drawings wherein is illustrated a view in elevation of the device, 1, indicates a suitable frame on which is mounted a shaft 2, provided with a wheel 3. This shaft and wheel may be operated by any desirable line of gearing, but as such forms no part of this invention, a detail thereof is believed unnecessary. It may be well to state, however, that in a co-pending application such gearing is shown and disclosed. Depending from the frame 1, and in alinement with the shaft 3, is an arm 4 which has pivoted near its end a lever 5, said lever being pivoted intermediate its length. The upper end of the lever 5, is provided with a curved portion 6 extending at right angles thereto and which is adapted to contact with the depending curved arm 7, which is pivoted at one end to the frame 1. This lever 7, carries a roller 8, of a yieldable material which is adapted to contact with the wheel 2.

Extending upwardly from the lever 5, is an arm 9, which is bent back upon itself as at 10. The curved portion 10, is intended to contact with a lever 12, pivoted intermediate its length at 13, to the frame 1. The contact of the portion 11, is made with the lever 12, below its pivotal point 13.

Carried by the upper end of the lever 12, is a roller 14, of yieldable material which is also intended to contact with the wheel 2. Pivotally secured to the lower end of the lever 5, is a rod 15, which is also pivotally secured to the end of a lever 16. This lever is pivoted at 11, intermediate its length to a depending arm 18, carried by said frame 1. When the lever 16, is moved in one direction it moves the lever 5, through the rod 15, and causes the projection 6, to contact with the lever 7, and the arm 9 to contact with the lever 12, thereby forcing the rollers 8, and 14, in contact with the wheel 2. The friction of this contact of the roller with the wheel controls the shaft 3, and the speed of the operating motor thereof is likewise controlled. Sufficient pressure may be made on the lever 16, as to cause such contact to stop entirely the rotation of the shaft 3.

Carried by the depending arm 18, is a curved or segmental rack 19, which is engaged by the pawl 20 of the lever 16. This pawl is to hold the lever 16, in its various adjustments. The pawl is released from the rack 19, by the ordinary means of the rod 21, and operating lever 22, as will, it is thought, be clearly apparent.

Having fully described my invention what I claim as new and desire to secure by Letters Patent, is—

1. In combination, a frame, a driving shaft, a wheel carried by the shaft, an arm pivoted to the frame, and depending therefrom, a roller carried by said arm, a second arm extending upwardly from the frame a roller on said second arm, a swinging lever, said lever having extensions engaging the arms in such a manner as to force the rollers in contact with the wheel.

2. In combination, a frame, a driving shaft, a wheel carried by the shaft, an arm pivoted to the frame and depending therefrom, a roller carried by said arm, a second arm extending upwardly from the frame a roller on said second arm, a swinging lever, said lever having extensions thereon engaging the arms in such a manner as to force the rollers in contact with the wheel, the depending arm normally resting on an extension of the swinging lever.

3. In combination, a frame, a driving shaft, a wheel carried by the shaft, an arm pivoted to the frame and depending therefrom, a roller carried by said arm, a second arm extending upwardly from the frame, a roller on said second arm, a swinging lever having an extension extending at approximately right angles thereto for engaging the depending arm, said swinging lever having a second extension extending approximately on the same plane for contacting with the upwardly extending lever, said extensions being adapted to force the rollers into contact with the wheel.

In testimony whereof I affix my signature in the presence of two witnesses, this 21st day of May, 1906.

GENE S. BLAKE.

Witnesses:
JOHN M. BUNDY,
WILLIAM L. CUNDIFF.